(12) United States Patent
Lee et al.

(10) Patent No.: US 12,177,206 B2
(45) Date of Patent: Dec. 24, 2024

(54) DEVICE FOR PROVIDING IDENTIFICATION INFORMATION, AND SYSTEM FOR SAME

(71) Applicant: Samsung Electronics Co., Ltd., Gyeonggi-do (KR)

(72) Inventors: Gawon Lee, Gyeonggi-do (KR); Eunyoung Kwon, Gyeonggi-do (KR); Dasom Lee, Gyeonggi-do (KR); Taeckki Lee, Gyeonggi-do (KR); Daehaeng Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 571 days.

(21) Appl. No.: 17/268,994

(22) PCT Filed: Sep. 16, 2019

(86) PCT No.: PCT/KR2019/011904
§ 371 (c)(1),
(2) Date: Feb. 17, 2021

(87) PCT Pub. No.: WO2020/060114
PCT Pub. Date: Mar. 26, 2020

(65) Prior Publication Data
US 2021/0314309 A1 Oct. 7, 2021

(30) Foreign Application Priority Data

Sep. 21, 2018 (KR) .................. 10-2018-0113899

(51) Int. Cl.
*H04L 9/40* (2022.01)
*H04L 41/22* (2022.01)

(52) U.S. Cl.
CPC ............ *H04L 63/083* (2013.01); *H04L 41/22* (2013.01); *H04L 63/0861* (2013.01); *H04L 63/102* (2013.01); *H04L 63/20* (2013.01)

(58) Field of Classification Search
CPC ... H04L 63/083; H04L 41/22; H04L 63/0861; H04L 63/102; H04L 63/20;
(Continued)

(56) References Cited

U.S. PATENT DOCUMENTS 8,850,210 B2 9/2014 Yokota et al.
9,208,492 B2 12/2015 Hoyos
(Continued)

FOREIGN PATENT DOCUMENTS

CN 107211026 A 9/2017
GB 2437761 A 11/2007
(Continued)

OTHER PUBLICATIONS

Gomi Hidehito, JP 2015-146128, Aug. 13, 2015, Machine Translation, pp. 1-39 (Year: 2015).*
(Continued)

*Primary Examiner* — Luu T Pham
*Assistant Examiner* — Canh Le
(74) *Attorney, Agent, or Firm* — Cha & Reiter, LLC

(57) ABSTRACT

Disclosed is an electronic device including: a communication circuit set to communicate with at least one authentication server for providing an identification authentication service; and a processor, wherein the processor is set to: transmit, to the at least one authentication server, first identifying information corresponding to an object to which identification information is to be provided and second identifying information corresponding to the electronic device; receive, from the at least one authentication server, information about a first item among a plurality of items of the identification information, the information about the first item being determined at least partially on the basis of the first identifying information and the second identifying information; and display, through the display, information
(Continued)

corresponding to a first value related to the first item among the plurality of items of the identification information in response to a successful user authentication. Various other embodiments comprehended through the specification are also possible.

11 Claims, 9 Drawing Sheets

(58) Field of Classification Search
CPC ... H04L 63/0892; H04L 9/006; H04L 9/3263; G06F 21/6245; G06F 21/32; G06F 21/33; G06F 21/46; H04W 12/06
See application file for complete search history.

(56) References Cited

U.S. PATENT DOCUMENTS

| | | |
|---|---|---|
| 9,294,475 B2 | 3/2016 | Hoyos |
| 9,313,200 B2 | 4/2016 | Hoyos |
| 9,877,193 B2 | 1/2018 | Li et al. |
| 10,405,181 B2 | 9/2019 | Li et al. |
| 10,856,148 B2 | 12/2020 | Li et al. |
| 2009/0106547 A1 | 4/2009 | Yokota et al. |
| 2014/0337221 A1* | 11/2014 | Hoyos .................... G07F 19/20 705/44 |
| 2016/0182506 A1 | 6/2016 | Hoyos |
| 2017/0295174 A1 | 10/2017 | Kim et al. |
| 2018/0068173 A1* | 3/2018 | Kolleri .................... G06Q 10/10 |
| 2018/0068312 A1 | 3/2018 | Kim et al. |
| 2018/0069937 A1* | 3/2018 | Kolleri .................. H04L 67/535 |
| 2018/0247295 A1* | 8/2018 | Kim ...................... H04M 1/673 |
| 2019/0246256 A1* | 8/2019 | Yang ...................... H04W 88/06 |

FOREIGN PATENT DOCUMENTS

| | | |
|---|---|---|
| JP | 2003-016168 A | 1/2003 |
| JP | 2005-025663 A | 1/2005 |
| JP | 2007-058781 A | 3/2007 |
| JP | 2015-146128 A | 8/2015 |
| KR | 10-2014-0029067 A | 3/2014 |
| KR | 10-2014-0126976 A | 11/2014 |

OTHER PUBLICATIONS

Maryline Laurent et al., "Towards a Secure Identity Management in Smartphone Environments," 2013, pp. 2133-2135. (Year: 2013).*
Tao Feng et al., "Continuous Remote Mobile Identity Management Using Biometric Integrated Touch-Display," 2012, pp. 56-62. (Year: 2012).*
Korean Office Action dated Nov. 15, 2022.
European Search Report dated Sep. 3, 2021.
Chinese Office Action dated Jun. 25, 2024.

* cited by examiner

DEVICE FOR PROVIDING IDENTIFICATION INFORMATION, AND SYSTEM FOR SAME

CROSS REFERENCE TO RELATED APPLICATIONS

This application is a National Phase Entry of PCT International Application No. PCT/KR2019/011904, which was filed on Sep. 16, 2019, and claims a priority to Korean Patent Application No. 10-2018-0113899, which was filed on Sep. 21, 2018, the contents of which are incorporated herein by reference.

TECHNICAL FIELD

Embodiments disclosed in this specification relate to a technology for providing identity information of a user of an electronic device.

BACKGROUND ART

Identity information may be verified offline with, for example, a plastic card, and thus a user needs to carry an identity card in person. Nowadays, with the activation of a payment service using an electronic device, a mobile identity card (e.g., a student ID or an employee ID) capable of replacing a physical card is being used. For example, a mobile identity card may be supported through an application installed in the electronic device.

DISCLOSURE

Technical Problem

An electronic device may output a mobile identity card on a display. The mobile identity card may include various pieces of personal information (e.g., a name, a resident registration number, and an address). A user is reluctant to expose the various pieces of personal information to other people through the screen. Information to be necessarily provided may be different depending on various situations in each of which the mobile identity card is used. Various embodiments disclosed in this specification are intended to provide a portable electronic device capable of providing only necessary identity information depending on a situation.

Technical Solution

According to an embodiment disclosed in this specification, an electronic device may include a communication circuit communicating with at least one authentication server providing an identity verification service, a display, at least one memory storing identity information associated with a user registered in the identity verification service, and the identity information including a plurality of items and values respectively corresponding to the plurality of items, and a processor. The processor may be configured to obtain first identification information corresponding to an object to be provided with the identity information, to transmit the first identification information and second identification information corresponding to the electronic device to the at least one authentication server, to receive information on a first item, which is determined based at least partly on the first identification information and the second identification information, from among a plurality of items of the identity information from the at least one authentication server, to perform user authentication on the user, and to display information corresponding to a first value corresponding to the first item among the plurality of items of the identity information through the display in response to a success of the user authentication.

Furthermore, according to an embodiment disclosed in this specification, a system providing an identity verification service may include the at least one authentication server providing the identity verification service, an electronic device of a user registered in the identity verification service and including identity information of the user including a plurality of items and values respectively corresponding to the plurality of items, and an external device registered in the identity verification service. The external device may transmit first identification information associated with the external device to the electronic device. The electronic device may transmit the first identification information and second identification information corresponding to the electronic device to the at least one authentication server. The at least one authentication server may transmit information on a first item, which is determined based on the first identification information and the second identification information, from among the plurality of items to the electronic device. The electronic device may perform user authentication on the user, and may display information associated with a first value corresponding to the first item through the electronic device or the external device in response to a success of the user authentication.

Advantageous Effects

According to embodiments disclosed in this specification, an electronic device may differentially provide identity information depending on a situation. Besides, a variety of effects directly or indirectly understood through the specification may be provided.

With regard to description of drawings, the same or similar components will be marked by the same or similar reference signs.

MODE FOR INVENTION

Hereinafter, various embodiments of the disclosure may be described with reference to accompanying drawings.

However, it should be understood that this is not intended to limit the disclosure to specific implementation forms and includes various modifications, equivalents, and/or alternatives of embodiments of the disclosure.

Figure 1:
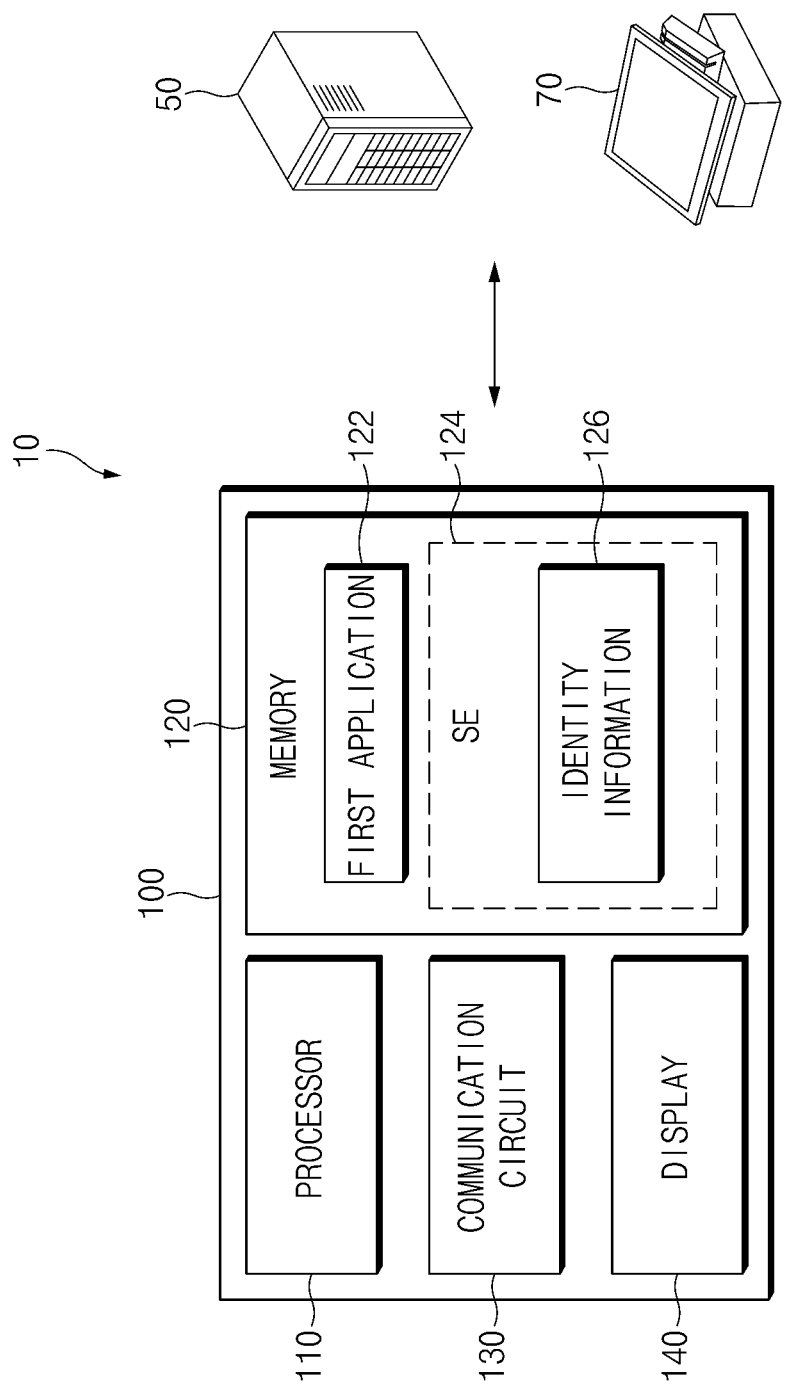
FIG. 1 illustrates an identity verification system and a block diagram of an electronic device according to an embodiment.

FIG. 1 illustrates an identity verification system and a block diagram of an electronic device according to an embodiment.

According to an embodiment, an identity verification system 10 may provide an identity verification service for a user registered in the identity verification service. The identity verification system 10 may include an electronic device 100 (e.g., an electronic device 901 of FIG. 9), an authentication server 50, and an external device 70.

For example, the authentication server 50 may provide the identity verification service. The electronic device 100 and the external device 70 may provide the identity verification service by communicating with the authentication server 50. The identity verification system 10 may include a plurality of authentication servers. However, the identity verification system 10 composed of the single authentication server 50 is disclosed by way of an example below. The electronic device 100 may exchange identity information and information associated with the identity information between the authentication server 50 and the external device 70.

For example, it may be understood that the electronic device 100 is a portable electronic device such as a smartphone or a tablet PC. Alternatively, the electronic device 100 may be a wearable device worn on a part of the user's body. It may be understood that the electronic device 100 is an electronic device owned by the user registered in the identity verification service. The electronic device 100 may store identity information associated with the user.

For example, it may be understood that the external device 70 is a device installed in an offline object (e.g., a store or an institution). For example, the external device 70 may be a point-of-service (POS) machine. The external device 70 may have a unique identity (ID) (hereinafter referred to as an 'object ID') for each device or for each offline object. The external device 70 may perform a specific function (e.g., a transaction or membership registration) that requires the user's identity information. Each specific function may have an ID (hereinafter referred to as a 'function ID') for each function. In various embodiments, the external device 70 may receive identity information necessary to perform the specific function from the electronic device 100 and/or the authentication server 50.

For example, the authentication server 50 may have information on an item (hereinafter referred to as a 'necessary item') of identity information necessary for the external device 70 to perform a specific function. The authentication server 50 may transmit information on the necessary item to the electronic device 100. The electronic device 100 may operate identity information on the user of the electronic device 100 based on the received information. In various embodiments, the authentication server 50 may store, in advance, whether the electronic device 100 or the external server 70 has an access right to identity information stored in the electronic device 100. Accordingly, the authentication server 50 may include an item having the access right in the necessary item. In an embodiment, the electronic device 100 may include a processor 110 (e.g., a processor 920 of FIG. 9), a memory 120 (e.g., a memory 930 of FIG. 9), a communication circuit 130 (e.g., a communication module 990 of FIG. 9), and a display 140 (e.g., a display device 960 of FIG. 9). The processor 110 may control overall operations of the electronic device 100. The electronic device 100 may transmit and receive data with the authentication server 50 and the external device 70 through the communication circuit 130.

In an embodiment, the memory 120 may store identity information associated with the user registered in the identity verification service. For example, the identity information may include a plurality of items and values respectively corresponding to the plurality of items. For example, when the item is a date of birth, the value may be stored as data in a numeric form of year-month-day. In an embodiment, the memory 120 may store a first application 122 for providing the identity verification service. In various embodiments, the electronic device 100 may launch the first application 122 and may output an execution screen of the first application 122 through the display 140. The execution screen may include a user interface (hereinafter referred to as a 'UI') including the identity information of the user in at least a part of the execution screen. In various embodiments, the UI may be implemented in various forms depending on a type of identity information to be displayed. Examples of the UI will be described later with reference to FIGS. 5 and 6.

In various embodiments, the electronic device 100 may include a secure element (SE) 124. The secure element 124 may store identity information 126. For example, the secure element 124 may have restrictions in direct communication with an external device such as the authentication server 50 or the external device 70. In this case, the secure element 124 may store a second application that is directly installed therein. In this case, the second application may relay data transmission/reception between the secure element 124 and the authentication server 50 or the external device 70. In another example, the authentication server 50 or the external device 70 may communicate with the secure element 124 through short-range wireless communication.

Figure 2:
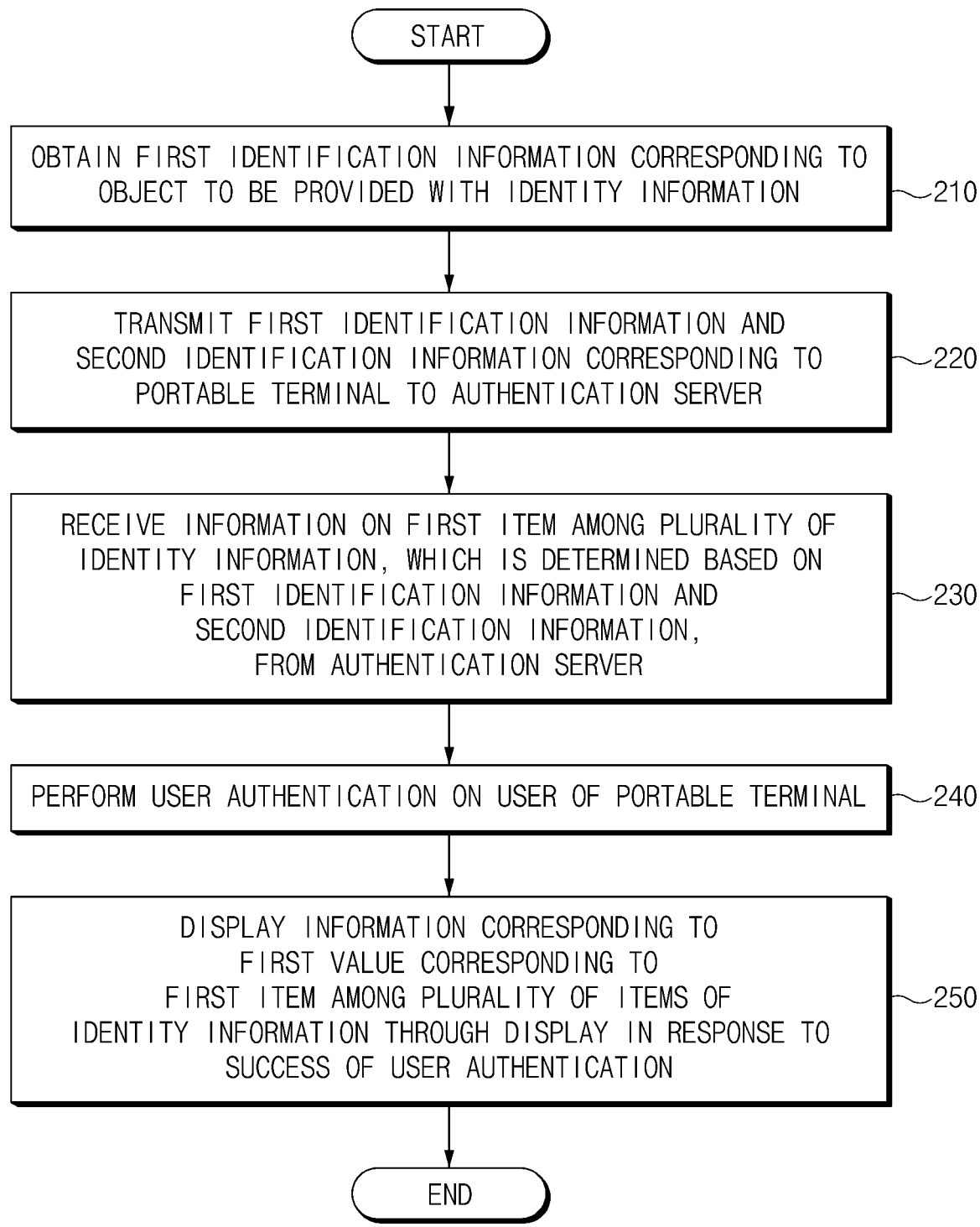
FIG. 2 is a flowchart illustrating how an electronic device provides identity information according to an embodiment.

FIG. 2 is a flowchart 1 illustrating how an electronic device provides identity information according to an embodiment.

Referring to FIG. 2, an identity information providing method according to an embodiment may include operation 210 to operation 250. For example, operation 210 to operation 250 may be performed by the electronic device 100 illustrated in FIG. 1. For example, operation 210 to operation 250 may be respectively implemented with instructions capable of being performed (or executed) by the processor 110 of the electronic device 100. The instructions may be stored in, for example, a computer-readable recording medium or the memory 120 of the electronic device 100 illustrated in FIG. 1. Hereinafter, in descriptions associated with operation 210 to operation 250, a description that is the same as the description given with reference to FIG. 1 may not be repeated here.

In operation 210, the electronic device 100 may obtain first identification information corresponding to an object to be provided with identity information. For example, the electronic device 100 may obtain the first identification information through the communication circuit 130 from the external device 70 corresponding to an object to be provided with the identity information 126. For example, the first identification information may include an object ID for an object associated with the external device 70, and a function ID for a function (e.g., a transaction or membership registration) performed by the external device 70.

In operation 220, the electronic device 100 may transmit the first identification information and second identification information corresponding to the electronic device to the authentication server 50. For example, the second identification information may include a user ID registered in an identity verification service. It may be understood that the second identification information refers to information necessary for the authentication server 50 to identify or authenticate a user of the electronic device 100.

In operation 230, the electronic device 100 may receive information on a first item among a plurality of items of the identity information 126, which is determined based on the first identification information and the second identification information, from the authentication server 50. For example, it may be understood that the first item is the 'necessary item' described above in FIG. 1. The authentication server 50 may select information on an item necessary for the external device 70 to perform a specific function among identity information stored in the electronic device 100 or the authentication server 50. For example, the necessary item may be mapped onto the function ID or the object ID and then may be stored.

In operation 240, the electronic device 100 may perform user authentication on the user. In various embodiments, the electronic device 100 may display a UI for requesting the user authentication through an execution screen of the first application 122. The electronic device 100 may obtain the user's authentication information in response to the display on a UI. For example, the authentication information may include at least part of a password and biometric information (e.g., fingerprint information, iris information, or face information).

In operation 250, the electronic device 100 may display information corresponding to a first value corresponding to the first item among a plurality of items of the identity information 126 through the display 140 in response to the success of the user authentication.

In an embodiment, the electronic device 100 may display the first value through the display 140. For example, when a value corresponding to an item of a date of birth is '1990-01-01', the electronic device 100 may display '1990-01-01' or 'Jan. 1, 1990' on the display 140. The user who has subscribed to the identity verification service may perform identity authentication required by an offline object by presenting identity information displayed on the electronic device 100 to the offline object.

In various embodiments, the electronic device 100 may generate a second value obtained by omitting at least part of the first value, and may display the second value through the display 140. For example, when 'whether you are an adult' is information required by the offline object, the electronic device 100 may display only information about 'year' in the date of birth on the display 140. In various embodiments, the electronic device 100 may generate a specific UI based on the first value. The electronic device 100 may display the generated UI on the display 140 through the execution screen of the first application 122. For example, when 'whether you are an adult' is information required by the offline object, the electronic device 100 may display a UI including a phrase of "I am an adult" and "I am over 19 years old" on the display 140. The related embodiment will be described with reference to FIG. 6.

In various embodiments, the electronic device 100 may transmit the first value to the external device 70. In this case, the external device 70 may perform a specific function by using the received first value. For example, when receiving a true value associated with 'whether you are an adult', the external device 70 may make a payment for alcoholic beverages and cigarettes based the true value. For another example, the external device 70 may receive values respectively associated with a plurality of items necessary for membership registration, and may perform a member registration function on the user by using the values.

Figure 3:
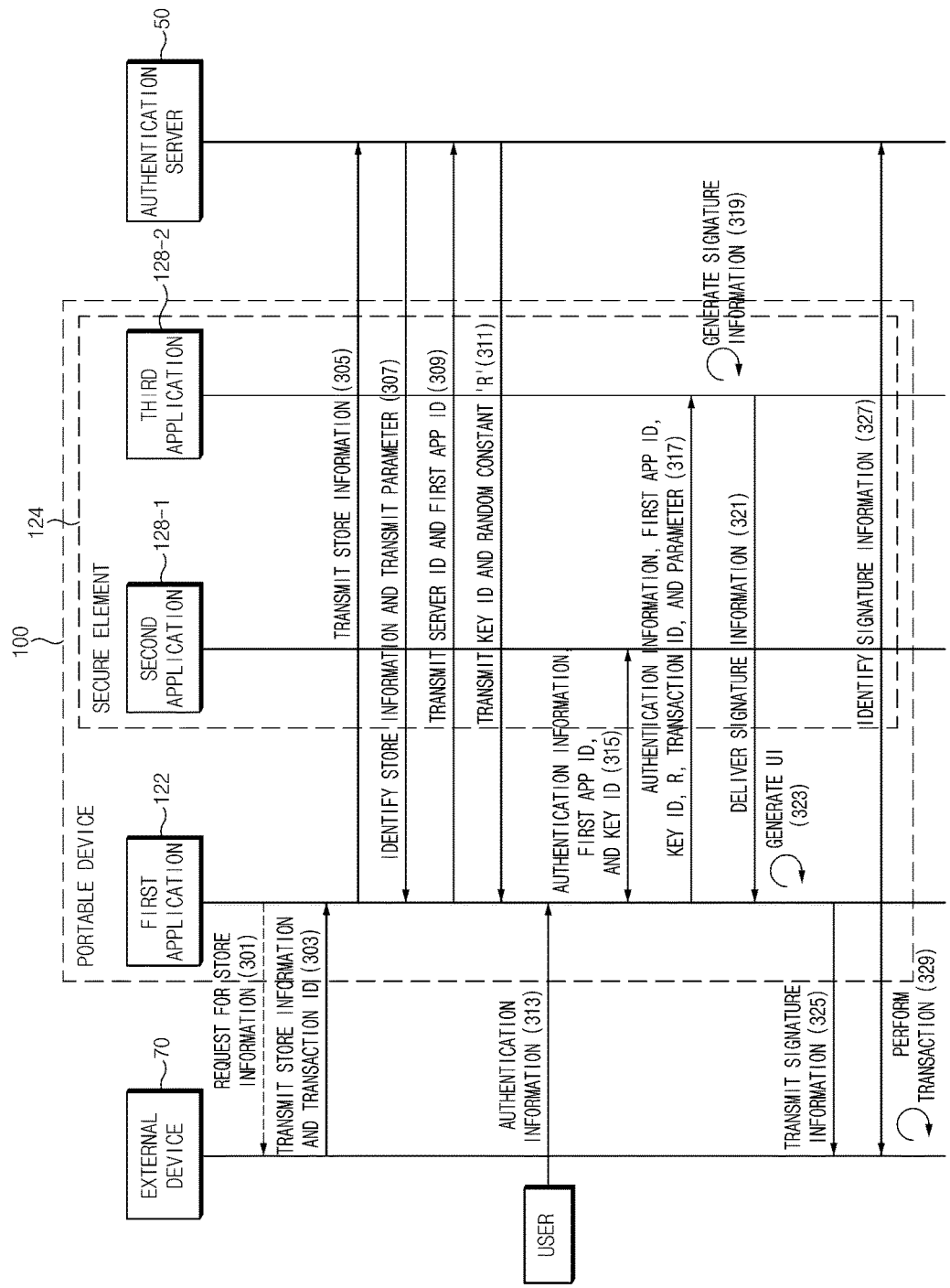
FIG. 3 is a signal flowchart of a method of providing identity information according to an embodiment.
Figure 4:
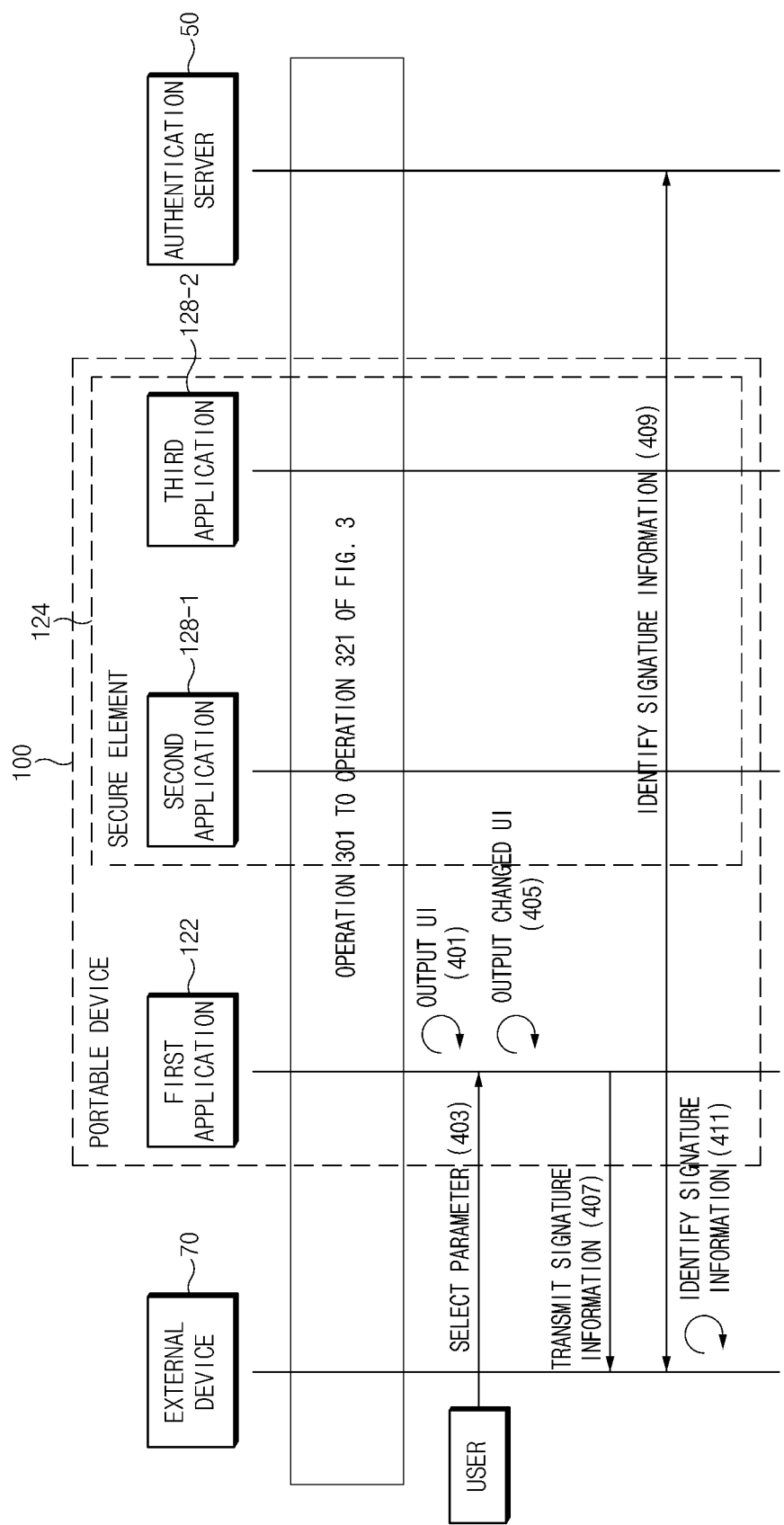
FIG. 4 is a signal flowchart of a method of changing a UI including identity information according to an embodiment.

FIG. 3 is a signal flowchart 2 of a method of providing identity information according to an embodiment. FIG. 4 is a signal flowchart 3 of a method of changing a UI including identity information according to an embodiment.

Hereinafter, specific examples of operations performed through the identity verification system 10 will be described with reference to FIGS. 3 to 4. In various embodiments, a user ID registered in an identity verification service may be referred to as a "server ID". For example, a user who has subscribed to the identity verification service may receive the server ID. The electronic device 100 may store the corresponding server ID in the memory 120.

It may be understood that the authentication server 50 is one or more servers providing the above-described identity verification service. In various embodiments, it may be assumed that at least part of the server ID and at least part of identity information on a user of the electronic device 100 (e.g., the electronic device 100 of FIG. 1 or the electronic device 901 of FIG. 9) are stored in storage of the authentication server 50 in advance. In some embodiments, information on the electronic device 100 registered in association with the server ID may be further stored in the storage of the authentication server 50. The authentication server 50 may include at least part of the server ID corresponding to each of users subscribed to the identity verification service, information on the electronic device 100, or identity information on a user. The electronic device 100 may map the server ID to the first application 122 and may store the mapped result in the memory 120. For example, it may be understood that the external device 70 is an electronic device installed in an offline object (e.g., a store or an institution). Hereinafter, a store among offline objects is described by way of an example. The authentication server 50 may store information on a store ID (e.g., an object ID in FIG. 2) corresponding to each of stores subscribed to the identity verification service, a transaction ID (e.g., a function ID of FIG. 2) for a transaction made by the corresponding store, and what identity information required by the corresponding store is. It may be understood that the store ID is a unique ID for identifying a specific store. For example, the identity information required in a store may be a parameter, and may be mapped and stored onto the store ID.

In an embodiment, in operation 301, the electronic device 100 may make a request for store information to the external device 70. For example, the electronic device 100 may request store information by reading a barcode/QR code output by the external device 70 provided in an offline store. For example, the first application 122 of the electronic device 100 may provide a menu for requesting the store information. For another example, the electronic device 100 may make a request for the store information to the external device 70 through short range wireless communication, Bluetooth communication, or Wi-Fi communication. In operation 303, the external device 70 may transmit store information and a transaction ID to the electronic device 100 in response to a request of the electronic device 100. In operation 305, the electronic device 100 may transmit the received store information to the authentication server 50. In operation 307, the authentication server 50 may search for store information stored in the authentication server 50 and may transmit a parameter corresponding to identity information requested by the corresponding store to a terminal, in response to receiving the store information. For example, the authentication server 50 may search for data stored after being mapped onto the received store ID. For example, each of items of the user's identity information may be parameterized and stored in the authentication server 50. The authentication server 50 may deliver information on the above-described 'necessary item' to the electronic device 100 or the external device 70 through the parameter. For example, the parameters may include a date of birth, a name, and an image such as a user's ID photo.

In various embodiments, it may be understood that parameters stored after being mapped onto the store information and/or transaction ID are pieces of minimum identity information required for the corresponding store and/or transaction. The authentication server 50 may restrict the transmitted or received parameter such that only the minimum identity information is used depending on a type of a store and/or transaction.

In various embodiments, when the authentication server 50 transmits the parameters to the electronic device 100, the electronic device 100 may select items to be used for identity verification from the stored identity information 126 to output or transmit the selected items to the external device 70.

In operation 309, the electronic device 100 may transmit a server ID stored in advance in the identity information 126 to the authentication server 50. In operation 311, the authentication server 50 may transmit a key ID stored after being mapped onto the received server ID and a nonce value of 'r' to be used for subsequent authentication, to the electronic device 100. For example, the key ID may be a public key corresponding to the electronic device 100. A pair of encryption keys including the public key may be generated by the secure element 124 when the electronic device 100 is registered in the authentication server 50. According to various embodiments, in operation 309, the electronic device 100 may transmit a first application ID for identifying a first application together with a server ID. For example, when the authentication server 50 supports a plurality of applications according to types of services, the authentication server 50 may identify services that are different depending on each application ID.

In various embodiments, in operation 313, the electronic device 100 may receive authentication information from the user of the electronic device 100. For example, the authentication information may include the user's biometric information. In one example, the electronic device 100 may output an interface for requesting fingerprint authentication for user authentication through an execution screen of the first application 122 and may obtain fingerprint information from the user. For example, the fingerprint information having an identifier different for each finger of the user may be obtained.

In various embodiments, the electronic device 100 may include a second application 128-1 and a third application 128-2 installed in the secure element 124. For example, it may be understood that the second application 128-1 and the third application 128-2 are applets for transmitting and receiving data between the secure element 124 and external devices, or performing a specific function using pieces of data stored in the secure element 124. In another embodiment, the second application 128-1 and the third application 128-2 in the secure element 124 may be composed of one applet. In operation 315, the electronic device 100 may deliver the obtained authentication information and a key ID to the second application 128 (e.g., the second application 128 in FIG. 1) and may determine whether the identity verification service is registered. For example, when authentication information is fingerprint information, the electronic device 100 may compare the fingerprint information with pre-stored fingerprint information through the second application 128. When pieces of fingerprint information having identifiers different for each finger of the user are stored, the electronic device 100 may compare a pattern with the received identifier of the fingerprint information.

In operation 317, the electronic device 100 may deliver authentication information, a key ID, a transaction ID, and a parameter, to the secure element 124. In operation 319, the electronic device 100 may generate signature information, by using the data transmitted in operation 317 and the data stored in the identity information 126. For example, operation 319 and operation 321 may be performed through the third application 128-2 installed in the secure element 1124.

In operation 323, the electronic device 100 may generate a UI by using the generated signature information. The UI may be displayed through the execution screen of the first application 122.

In an embodiment, the UI may include identity information. For example, a mobile identity card may be output through the corresponding UI. The mobile identity card may be generated based on the parameter received from the authentication server 50. For example, when a mobile identity card is displayed, only necessary items may be displayed depending on a transaction with a store, and the remaining items may be omitted. For example, items corresponding to the received parameter may be displayed, and other items that do not correspond to the received parameter may not be displayed.

In various embodiments, in operation 325, the electronic device 100 may transmit the generated signature information to the external device 70. The external device 70 may directly perform identity authentication based on the received signature information. At this time, the external device 70 may transmit the received signature information to the authentication server 50, and may receive identity information of the user of the electronic device 100 from the authentication server 50. In operation 327, the external device 70 may directly perform identity verification on a user by using the received identity information. In operation 329, the external device 70 may make a transaction to be performed based on the authenticated identity information. For example, the external device 70 may make a payment for items such as alcoholic beverages and cigarettes that are sold to people over the age of 19.

The user registered in the identity verification service and an offline store registered in the identity verification service may perform identity verification by using the electronic device 100 and the external device 70, through operations shown in FIG. 3. When the user authentication service according to an embodiment of the disclosure is provided, the electronic device 100 may generate a signature by using only necessary information required for identity verification. The UI output through the electronic device 100 may display only necessary identity information, and thus all pieces of identity information associated with the user may not be exposed.

In various embodiments, the electronic device 100 may change the UI of the mobile identity card displayed on the electronic device 100. As described above in FIG. 3, the electronic device 100 may generate a signature and an identity card UI by using the minimum information required in the offline store. At this time, the user may select the identity information of an item to be additionally provided among items that are not displayed. In various embodiments, in a situation where specific information is presented to an employee in a store when the user faces the employee in the offline store, the user may selectively provide additional information by changing a UI. In an embodiment, in operation 401, a UI including identity information may be displayed through the display 140 of the electronic device 100. For example, the UI may be generated based on at least part of the parameters received through operation 307 in FIG. 3. The UI may include at least part of identity information corresponding to the parameters. In various embodiments, the electronic device 100 may display a list of parameters, which are not displayed, through the UI or another UI (or another region of the display 140 where the UI is not displayed).

In various embodiments, in operation 403, the electronic device 100 may receive a selection input for a parameter to be displayed from the user. For example, it may be understood that the selected parameter is a parameter that is not currently displayed on the UI. In another embodiment, the electronic device 100 may receive an input to change a region in which identity information is to be displayed. In operation 405, the electronic device 100 may additionally display identity information corresponding to the selected parameter through the display 140 in response to the selection input. For example, a changed UI may be displayed to include identity information corresponding to the selected parameter. Operation 407, operation 409, and operation 411 in FIG. 4 may correspond to operation 325, operation 327, and operation 329 in FIG. 3, respectively.

Figure 5:
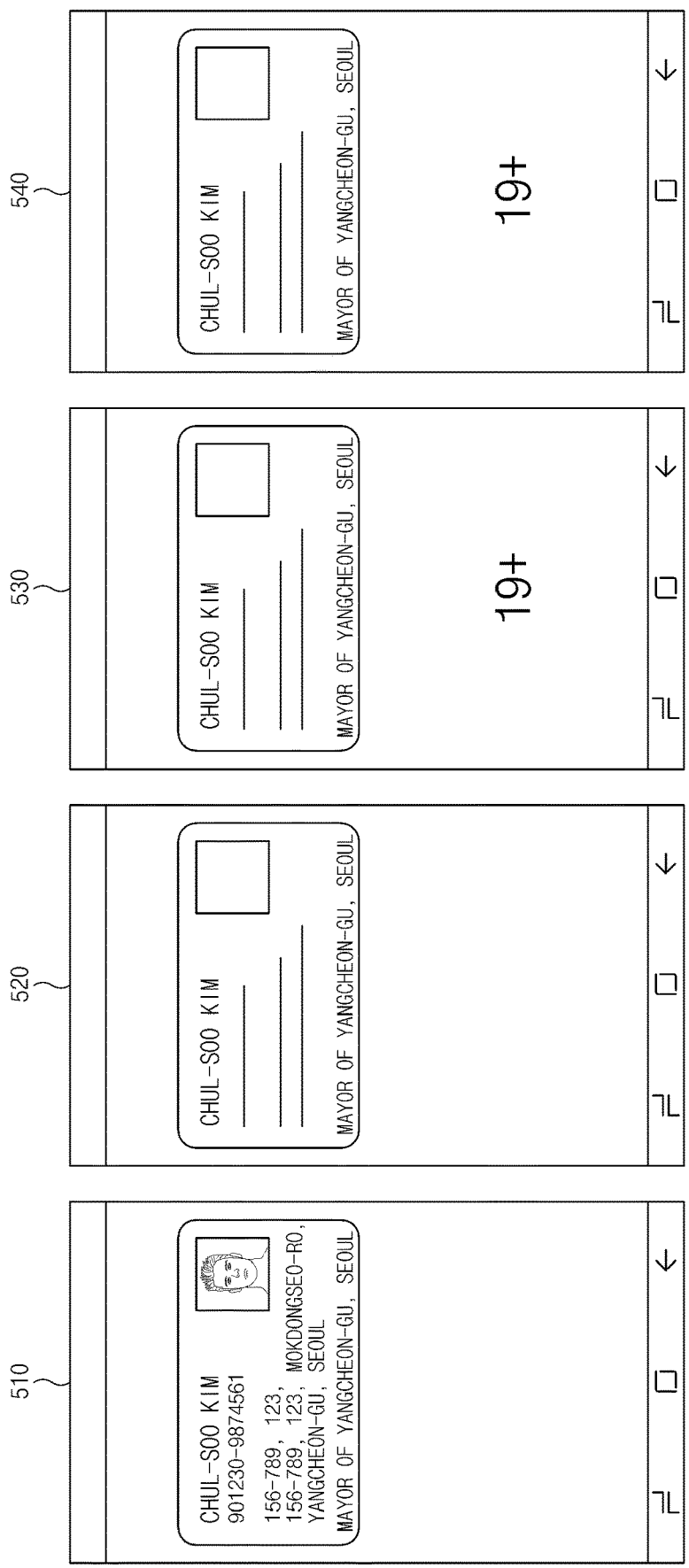
FIG. 5 is examples of a mobile identity card including identity information that varies depending on a situation in various embodiments.

FIG. 5 is examples of a mobile identity card including identity information that varies depending on a situation in various embodiments.

Referring to FIG. 5, a mobile identity card according to various embodiments is illustrated. For example, it may be assumed that identity information required by an offline store is 'whether you are an adult'. In this case, a transaction may be 'a payment requiring adult certification for alcoholic beverages and cigarettes'. A necessary parameter corresponding to the corresponding store and the corresponding transaction may be 'date of birth'.

A first UI 510 is an example of a mobile identity card including all pieces of identity information. A second UI 520 is an example of a mobile identity card including only name information and information about a date of birth. For example, identity information (e.g., a photo or an address) may be blurred, not the necessary identity information. A third UI 530 is an example of a mobile identity card including the additional information with the name information and the information about a date of birth. For example, the third UI 530 may include additional information 531 displaying 'whether you are an adult' that is necessary information required by an offline store.

A fourth UI 540 is an example of a mobile identity card that includes only information about 'whether you are an adult' that is necessary information required by the offline store, without including the information about a date of birth. A user may perform identity verification by providing only information 541 about 'whether you are an adult' to the offline store.

Figure 6:
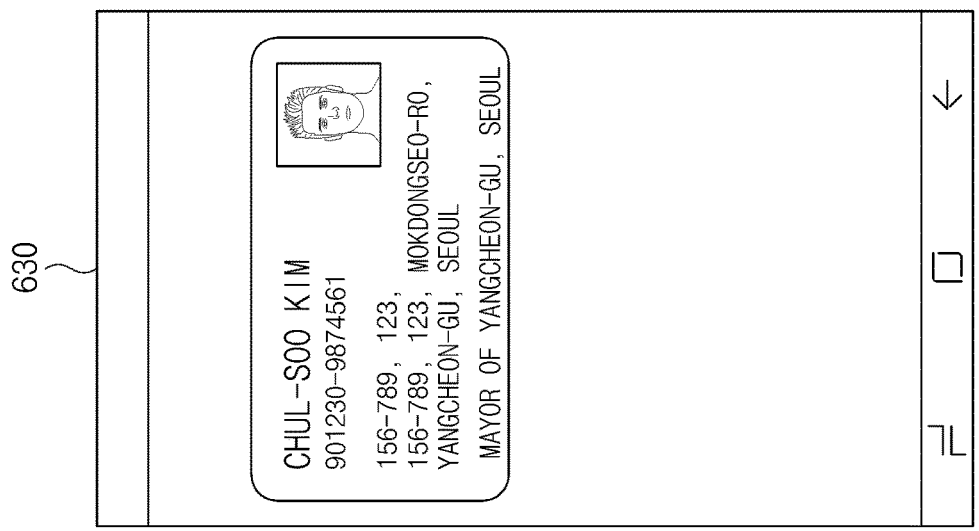
FIG. 6 is an example of mobile identity cards providing identity information that varies depending on a user's selection, in various embodiments.
Figure 6:
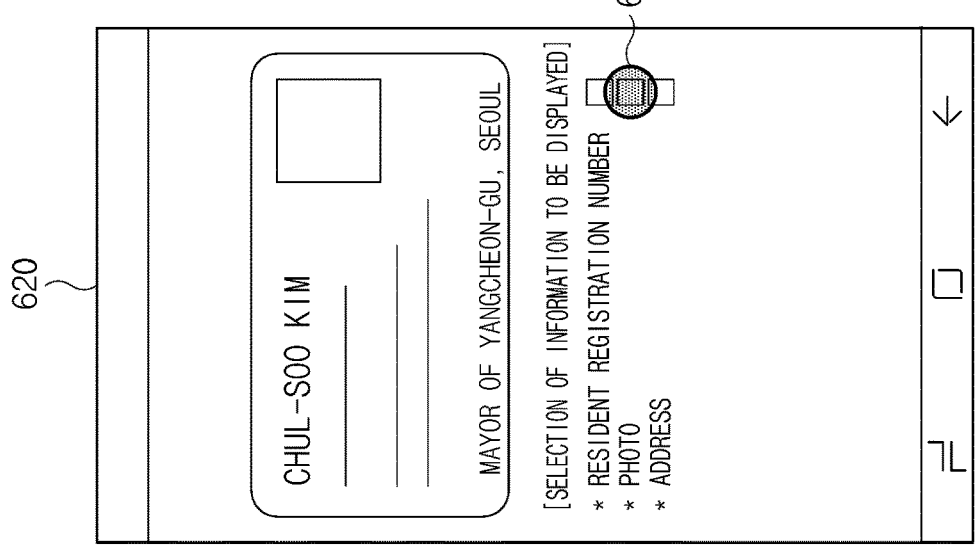
Figure 6:
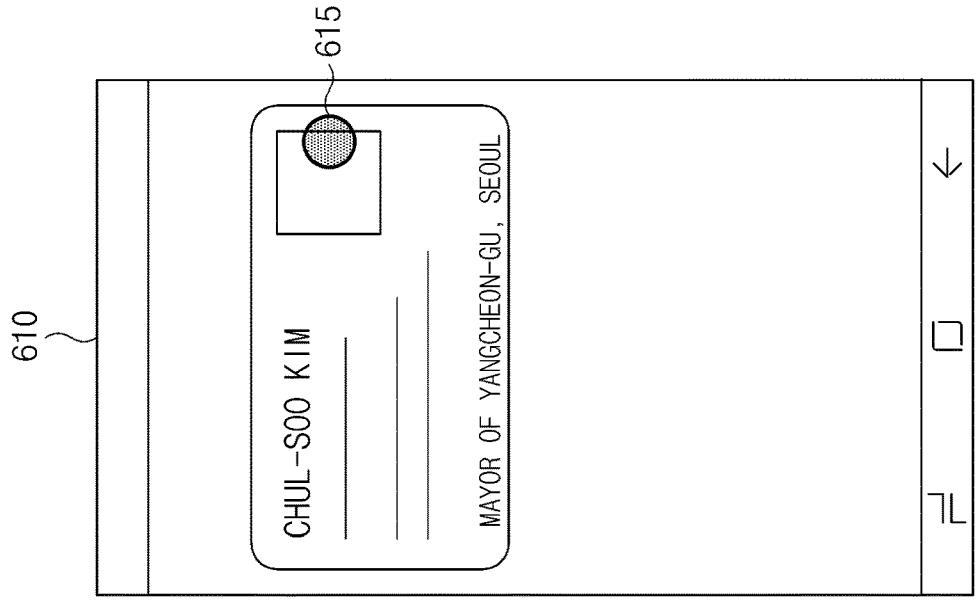

FIG. 6 is an example of mobile identity cards providing identity information that varies depending on a user's selection, in various embodiments.

In various embodiments, the electronic device 100 (e.g., the electronic device 100 of FIG. 1 or the electronic device 901 of FIG. 9) may change a UI depending on a selection input. For example, the electronic device 100 may receive a selection input to a second item different from a first item, which is already displayed, from among a plurality of items included in the identity information 126. The electronic device 100 may display information corresponding to a second value corresponding to the second item on the display 140 through an execution screen of the first application 122, in response to the corresponding selection input. The electronic device 100 may display at least part of the remaining items other than the first item, which is already displayed, from among the plurality of items included in the identity information 126 as a selection item on the display 140. For example, when the second item displayed as the selection item is selected by a user, the electronic device 100 may display information corresponding to a second value corresponding to the second item on the display 140.

For example, when a touch input is received in a specific region where the specific identity information of the mobile identity card output through the display 140 is displayed, the electronic device 100 may change whether to display the specific identity information.

Referring to a fifth UI 610, when a touch input 615 is received in a region where a photo is displayed, the electronic device 100 may control the display 140 such that the photo is displayed or the photo is not displayed. For example, in a situation where a photo is not displayed on the mobile identity card, when a user desires to additionally display photo information, the user may touch a region where a photo is to be displayed. When the electronic device 100 receives the touch input, the electronic device 100 may obtain a parameter corresponding to photo information from the authentication server 70 (or may use a parameter that is received in advance), and may output the photo information through the display 140 based on the parameter.

In various embodiments, the electronic device 100 may display items of identity information capable of being additionally provided, through the display 140. The electronic device 100 may additionally display items selected from the items through the display 140. For example, items of the identity information may correspond to parameters previously received from the authentication server 50.

Referring to a sixth UI 620, a selection interface 622 for additional items is illustrated. The selection interface 622 may include the items (a resident registration number, a photo, and an address) of the identity information capable of being additionally provided. For example, when a selection input 625 to a photo item among items included in the selection interface 622 is received, the electronic device 100 may further display the photo item. For example, when all items included in the selection interface 622 are selected, all pieces of identity information included in the mobile identity card may be displayed through the display 140 as illustrated in a seventh UI 630.

In various embodiments, the electronic device 100 may display identity information in various forms, not a form of the above-described mobile identity card. For example, when a user desires to purchase alcoholic beverages from an offline store and to ship the alcoholic beverages to his/her house, the electronic device 100 may output a UI including only 'whether you are an adult' and an 'address'. For example, a user may provide a store with address information in addition to adult certification as a type of required information to be displayed, using a mobile identity card. In various embodiments, when generating signature information, the electronic device 100 may additionally receive a parameter from the user and may generate a signature by using the parameter.

Figure 7:
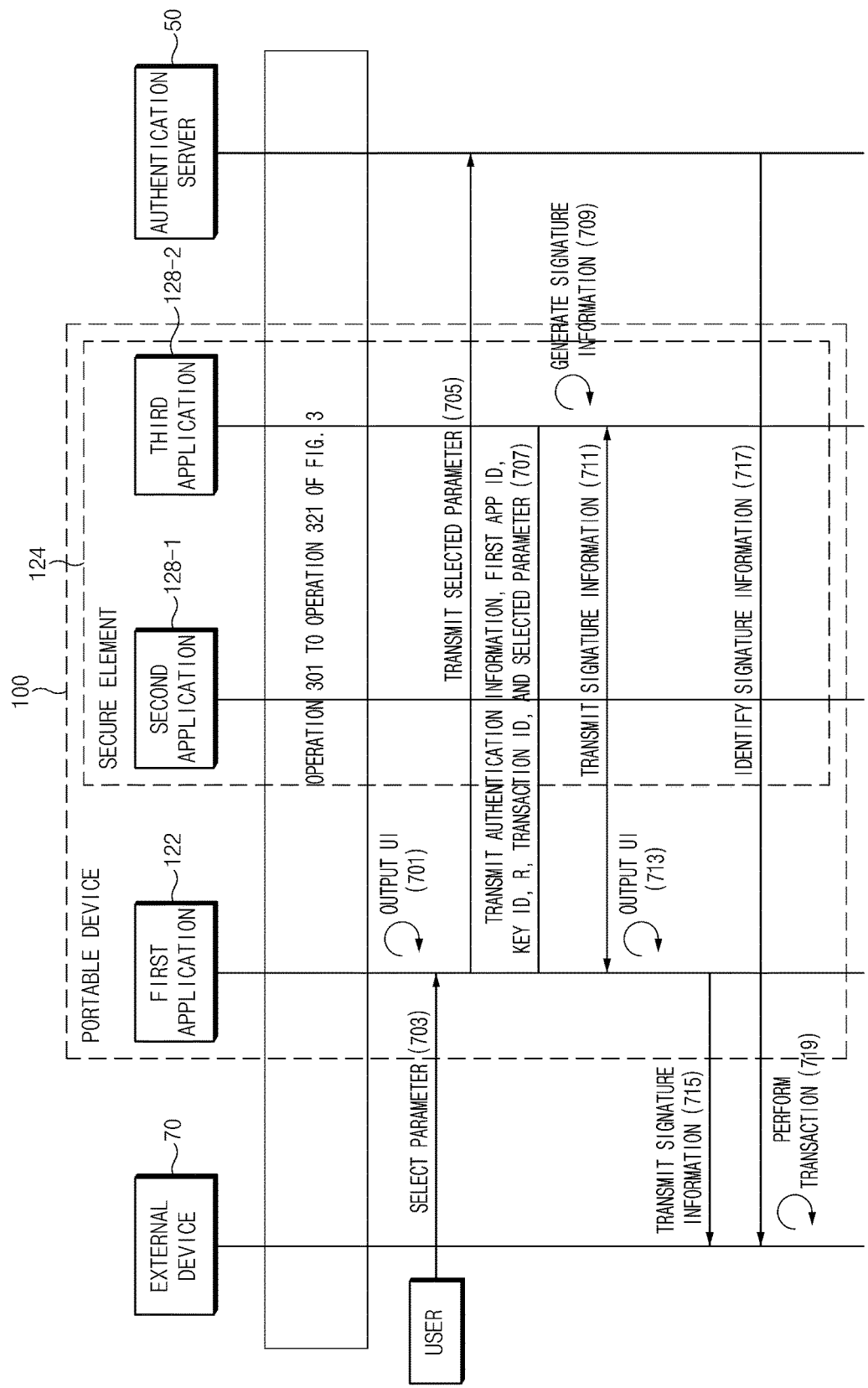
FIG. 7 is a signal flowchart of a method of providing identity information according to various embodiments.

FIG. 7 is a signal flowchart 4 of a method of providing identity information according to various embodiments.

In operation 701, the electronic device 100 (e.g., the electronic device 100 of FIG. 1 or the electronic device 901 of FIG. 9) may display a UI through the display 140. At this time, the electronic device 100 may display the UI including parameters received from the authentication server 60.

In operation 703, the electronic device 100 may receive a selection input for a parameter to be displayed among parameters that are not displayed. In another embodiment, the electronic device 100 may receive a change input to change a region where a parameter is to be displayed. For example, the selection input or the change input may be received through an execution screen of the first application 122 that provides an identity verification service. For another example, the selection input or the change input may be received through another menu button disposed in a region (e.g., a region where a mobile identity card is displayed) other than a region where identity information is displayed. Hereinafter, a parameter added by a user input is described as a 'selected parameter'.

In operation 705, the electronic device 100 may transmit information on the selected parameter to the authentication server 50. In operation 706, the electronic device 100 may receive a nonce value 'r' from the authentication server 50.

In operation 707, the electronic device 100 may deliver pieces of data necessary to generate signature information to a third application. For example, operation 707 may correspond to operation 317 of FIG. 3. In operation 709, the electronic device 100 may generate a signature by using the received information and pieces of data stored in the secure element 124. For example, the electronic device 100 may generate a signature based on both a parameter received from the authentication server 50 and a parameter selected by a user. For example, the parameter may be information about a date of birth. The selected parameter may be address information selected by the user. In various embodiments, in operation 711, the signature generated by the third application 128-2 may be delivered to the first application 122 and may be used. In operation 713, the electronic device 100 may output a UI including both the parameter and the received parameter.

In various embodiments, in operation 715, the electronic device 100 may transmit the signature generated in operation 709 to the external device 70. The external device 70 may directly authenticate the user by using the received signature. In operation 717, the external device 70 may transmit the received signature to the authentication server 50 to determine whether identity information included in the signature has been forged or modified. When the identity information is verified, in operation 719, the external device 70 may perform a transaction according to the verified identity information.

In various embodiments, the authentication server 50 may directly transmit identity information on a user of the electronic device 100 to the external device 70. In this case, the electronic device 100 may generate a signature including only parameters corresponding to identity information to be transmitted, and may transmit the signature to the authentication server 50. After verifying forgery/modification of the received signature, the authentication server 50 may transmit identity information corresponding to a parameter included in the corresponding signature to the external device 70.

In the embodiment, the electronic device 100 may display a list of identity information transmitted to the external device 70, through an execution screen of the first application 122. The electronic device 100 may display a UI for requesting a user's consent to the list of the identity information. When the user's consent input is received in association with a UI, the electronic device 100 may transmit a message indicating that the user's consent has been received, to the authentication server 50. The authentication server 50 may transmit the identity information to the external device 70 in response to receiving the message.

In various embodiments, the external device 70 may have at least part of the identity information of the user registered in the identity verification service. In this case, at least part of the user's identity information may be provided through the external device 70. The electronic device 100 may transmit signature information to the external device 70. The external device 70 may transmit the signature information to the authentication server 50 and may authenticate the signature information. When the signature information is authenticated by the authentication server 50, the external device 70 may search for identity information corresponding to a parameter included in the corresponding signature information and may perform a subsequent transaction procedure. In various embodiments, the external device 70 may provide the above-described service through a display and an output device of the external device 70.

In the embodiment, specific identity information on a user of the identity verification service may be forcibly provided depending on the authority of the external device 70 used in the offline store. Alternatively, a UI for recommending identity information necessary for operations performed by the external device 70 may be provided.

For example, identity information necessary to process a specific service provided by a public institution may be determined in advance. In this case, the external device 70 operated by the public institution may be required for a specific service and may have authority for pre-determined identity information. For example, the external device 70 in the public institution may obtain necessary identity information from the authentication server 70 or the electronic device 100 without the consent of the user.

In various embodiments, when the authentication server 50 obtains the user's consent in advance in the registration process of the identity verification service, the identity information on the user may be automatically provided to the electronic device 100 and/or the external device 70, which is registered in the identity verification service. For example, while someone subscribes to an insurance service, the external device 70 (e.g., a tablet PC or PC) of an insurance agent may receive identity information of an insurance subscriber through the identity verification service. For example, the external device 70 may obtain identity information necessary to subscribe to an insurance service through the electronic device 100 of the insurance subscriber or the authentication server 50.

Figure 8:
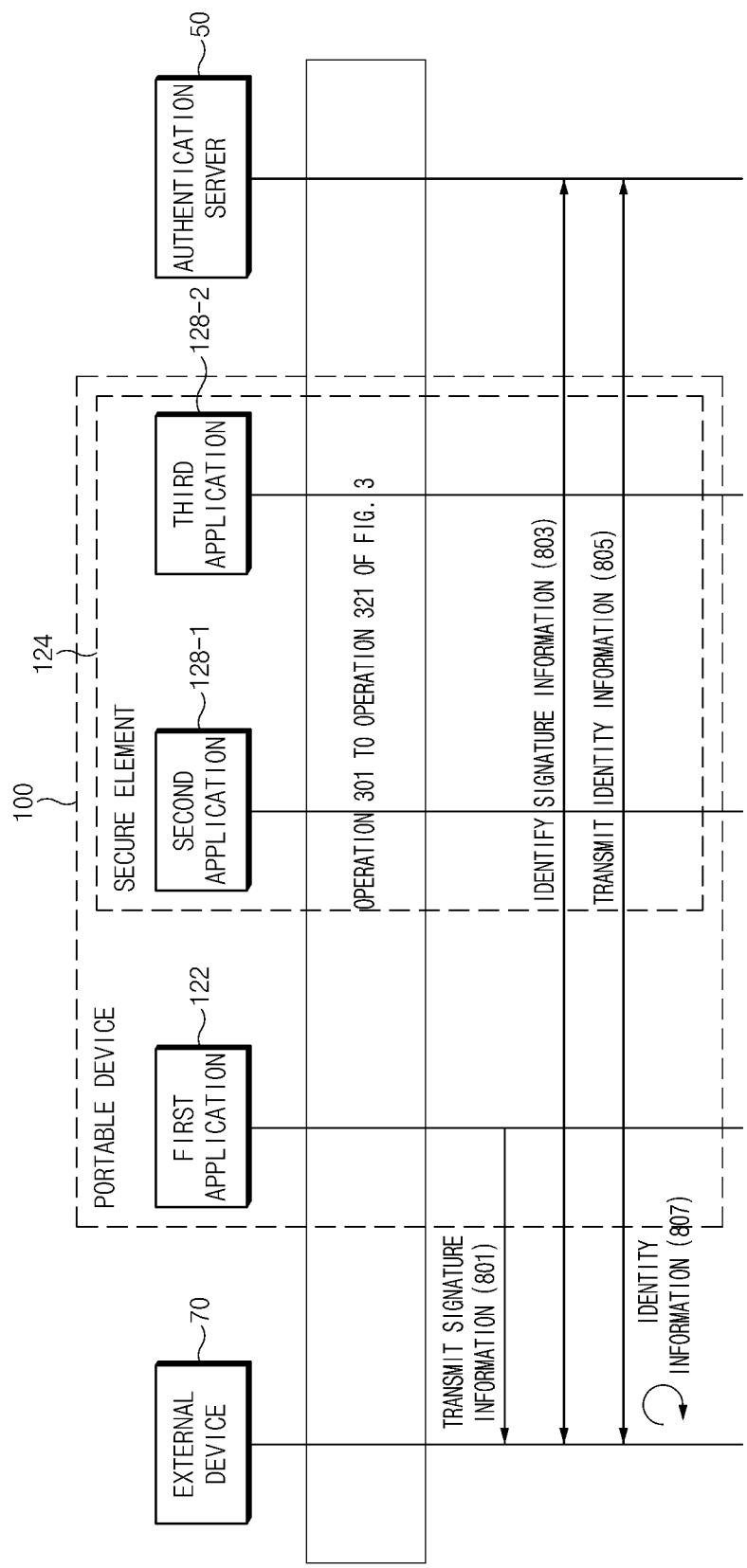
FIG. 8 is a signal flowchart of a method of performing identity verification in an external device according to various embodiments.

FIG. 8 is a signal flowchart 5 of a method of performing identity verification in an external device according to various embodiments.

In various embodiments, in operation 801, signature information generated in FIG. 3 may be transmitted to the external device 70. The external device 70 may determine whether the received signature information is valid. In operation 803, the external device 70 may transmit the received signature information to the authentication server 50, and the authentication server 50 may determine whether the corresponding signature information is forged or modified. When the authentication server 50 authenticates users of the electronic device 100 (e.g., the electronic device 100 of FIG. 1 or the electronic device 901 of FIG. 9) and the external device 70 and there is no forgery or modification, in operation 805, the authentication server 50 may transmit information required by the external device 70.

The external device 70 may re-process the received identity information. For example, the external device 70 may generate a UI including identity information, and may output the UI through a display provided in the external device 70. A clerk in a store may identify the UI. In still another embodiment, when the external device 70 performs a member registration function, the external device 70 may receive identity information necessary for membership registration from the authentication server 50. The external device 70 may automatically perform a member registration function based on the received identity information.

Figure 9:
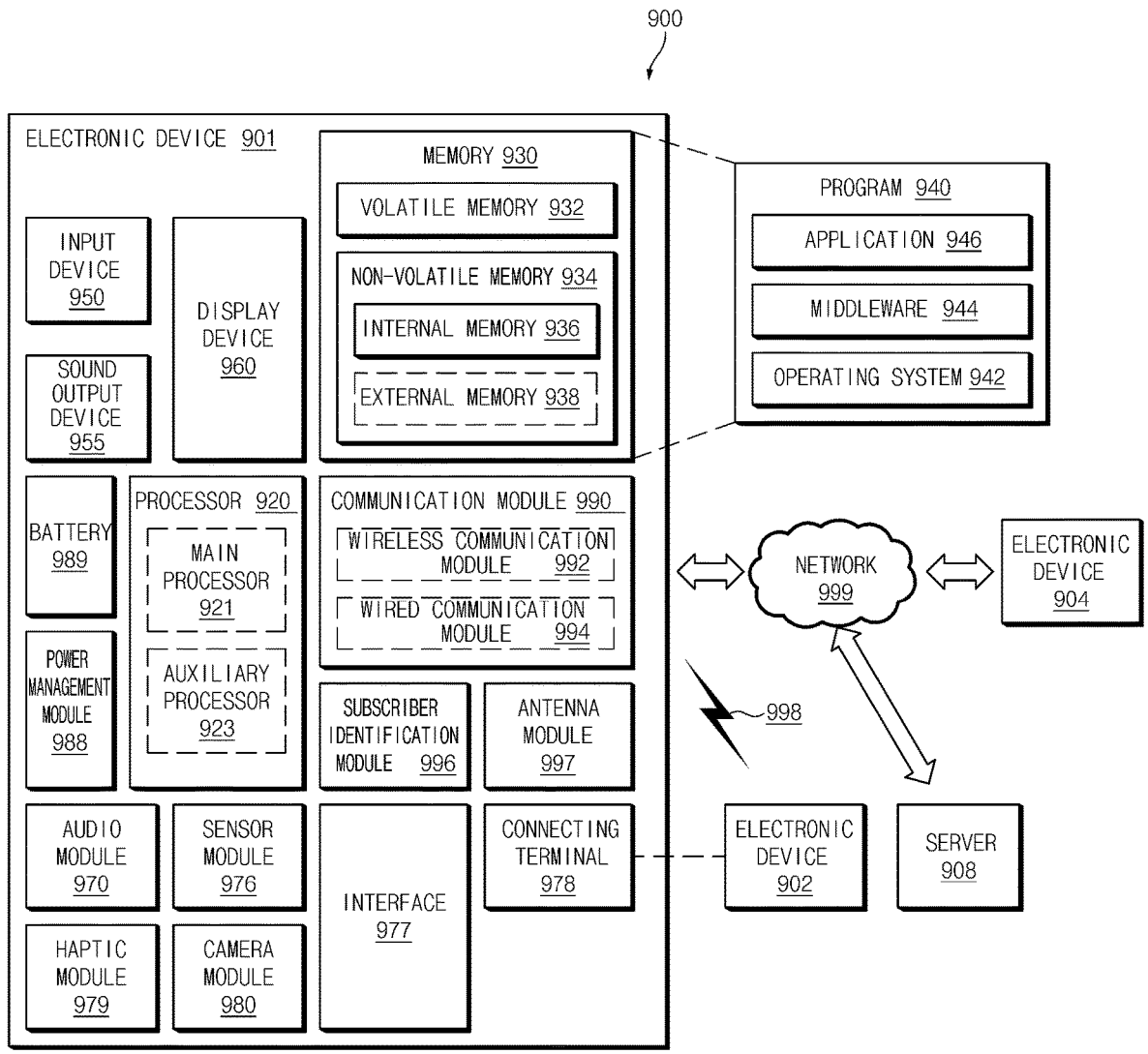
FIG. 9 illustrates an electronic device in a network environment according to various embodiments.

FIG. 9 is a block diagram illustrating an electronic device 901 (e.g., the electronic device 100 of FIG. 1) in a network environment 900 (e.g., the identity verification system 10 of FIG. 1) according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920 901 (e.g., the processor 110 of FIG. 1), memory 930 (e.g., the memory 120 of FIG. 1), an input device 950, a sound output device 955, a display device 960 (e.g., the display 140 of FIG. 1), an audio module 970, a sensor module 976, an interface 977, a haptic module 979, a camera module 980, a power management module 988, a battery 989, a communication module 990 (e.g., the communication circuit 130 of FIG. 1), a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector), The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a communication circuit configured to communicate with at least one authentication server providing an identity verification service;
   a display;
   at least one memory configured to store identity information associated with a user registered in the identity verification service, wherein the identity information includes a plurality of items and values respectively corresponding to the plurality of items; and
   a processor, wherein the processor is configured to:
   obtain first identification information corresponding to an object, wherein the object is one of a store or institution corresponding to an external device;
   transmit the first identification information corresponding to the object and second identification information corresponding to the electronic device to the at least one authentication server;
   based on transmitting the first identification information and the second identification information, receive a parameter corresponding to a first item required by the object among the plurality of items of the identity information from the at least one authentication server, wherein the parameter is determined based at least partly on the first identification information and the second identification information, from among the plurality of items of the identity information;
   perform user authentication on the user, wherein user authentication comprises:
   execute a first application providing identity verification service; and
   display a user interface (UI) through an execution screen of the first application on the display;
   in response to a success of the user authentication, providing the identity information based on the received parameter through the UI; and
   display, through the UI, information corresponding to a first value corresponding to the first item on the display while preventing values corresponding to items other than the first item among the plurality of items from being displayed.

2. The electronic device of claim 1, wherein the processor is configured to:
   receive a selection input to a second item different from the first item among the plurality of items; and
   display, through the UI, information corresponding to a second value corresponding to the second item on the display in response to the selection input.

3. The electronic device of claim 2, wherein the processor is configured to:
   display, through the UI, at least partial items of the plurality of items on the display; and
   receive the selection input to the second item included in the at least partial items.

4. The electronic device of claim 1, wherein the processor is configured to:
   display an interface for requesting the user authentication through the execution screen; and
   obtain authentication information of the user in response to a display of the interface.

5. The electronic device of claim 4, wherein the processor is configured to:
obtain at least one of biometric information of the user or a password as the authentication information.

6. The electronic device of claim 1, wherein the identity information is stored in a secure element in the at least one memory.

7. The electronic device of claim 1, wherein the first identification information includes an object identification (ID) associated with the external device, and a function ID associated with a function performed by the external device.

8. The electronic device of claim 1, wherein the processor is configured to:
transmit the first value to the external device.

9. The electronic device of claim 1, wherein displaying information corresponding to the first value comprises displaying the first value.

10. The electronic device of claim 1, wherein the processor is configured to:
determine a second value obtained by omitting at least part of the first value; and
display, through the UI the second value as the information corresponding to the first value.

11. The electronic device of claim 9, wherein the processor is configured to:
receive a selection input to a second item different from the first item among the plurality of items; and
display, through the UI, information corresponding to a second value corresponding to the second item in response to the selection input.

* * * * *